June 7, 1949.　　　　B. QUINTON　　　　2,472,491
MOBILE LUGGAGE
Filed July 1, 1947　　　　　　　　2 Sheets-Sheet 1
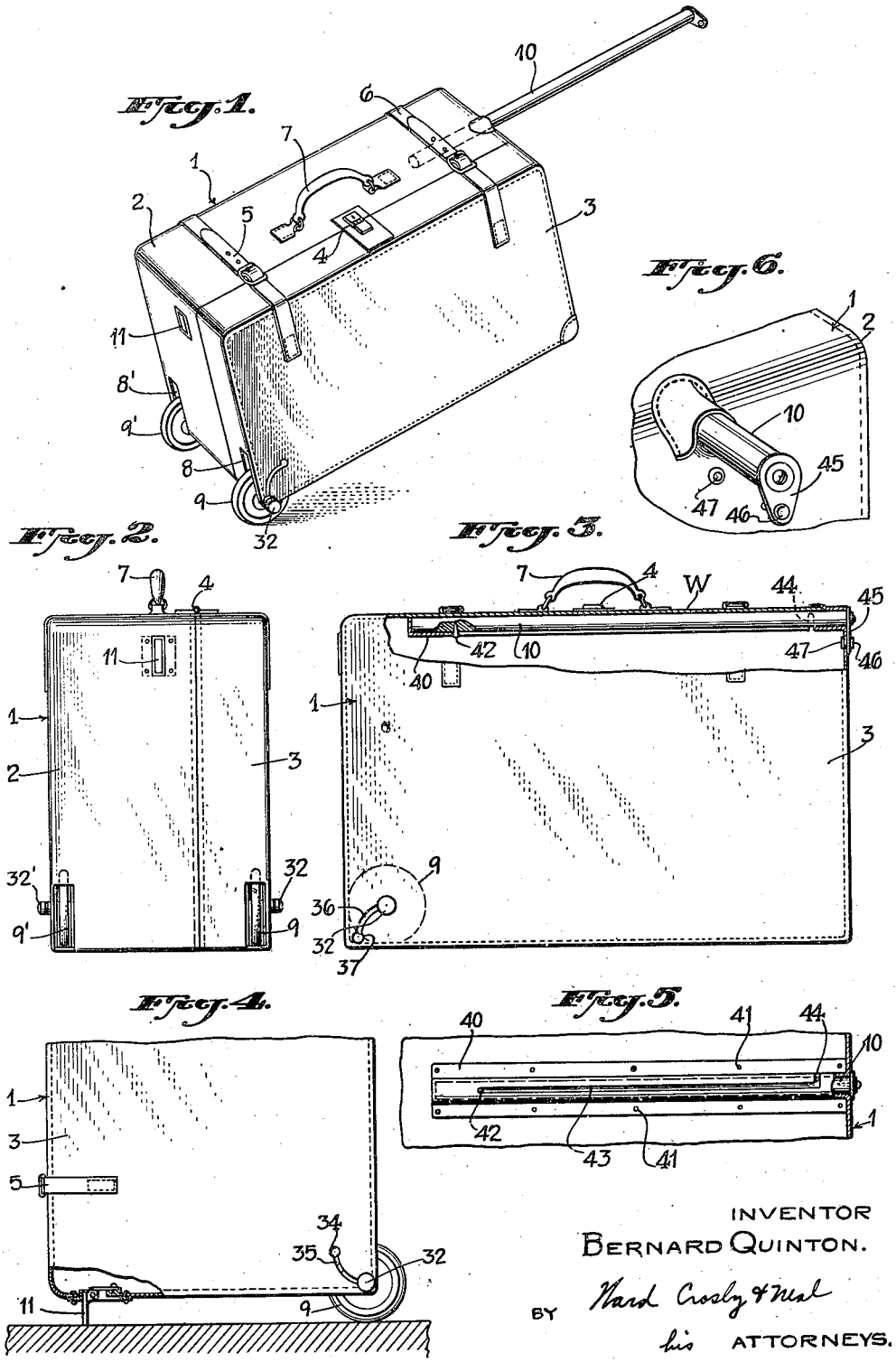
INVENTOR
BERNARD QUINTON.
BY Ward Crosby & Neal
his ATTORNEYS.

June 7, 1949.  B. QUINTON  2,472,491
MOBILE LUGGAGE
Filed July 1, 1947  2 Sheets-Sheet 2
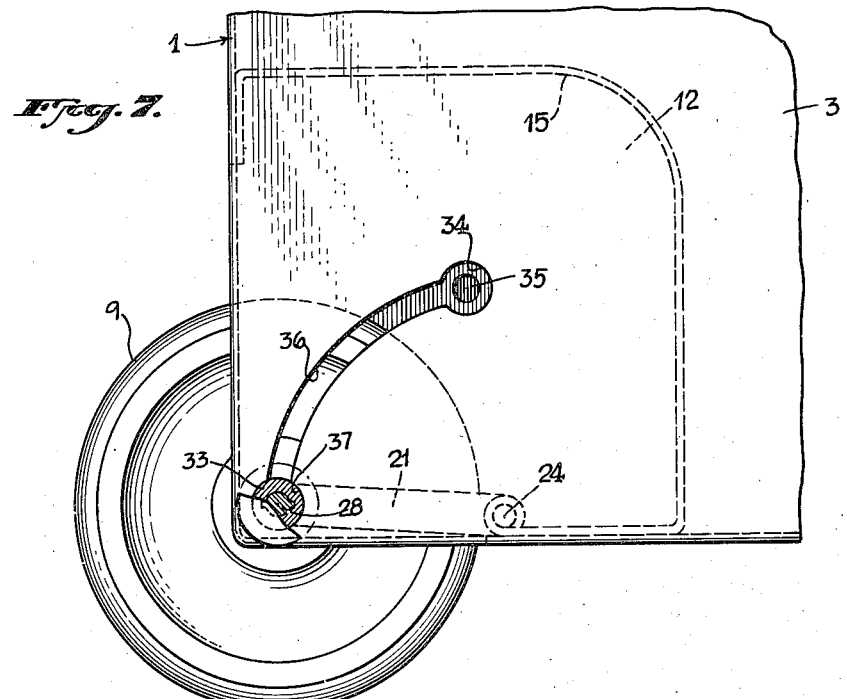
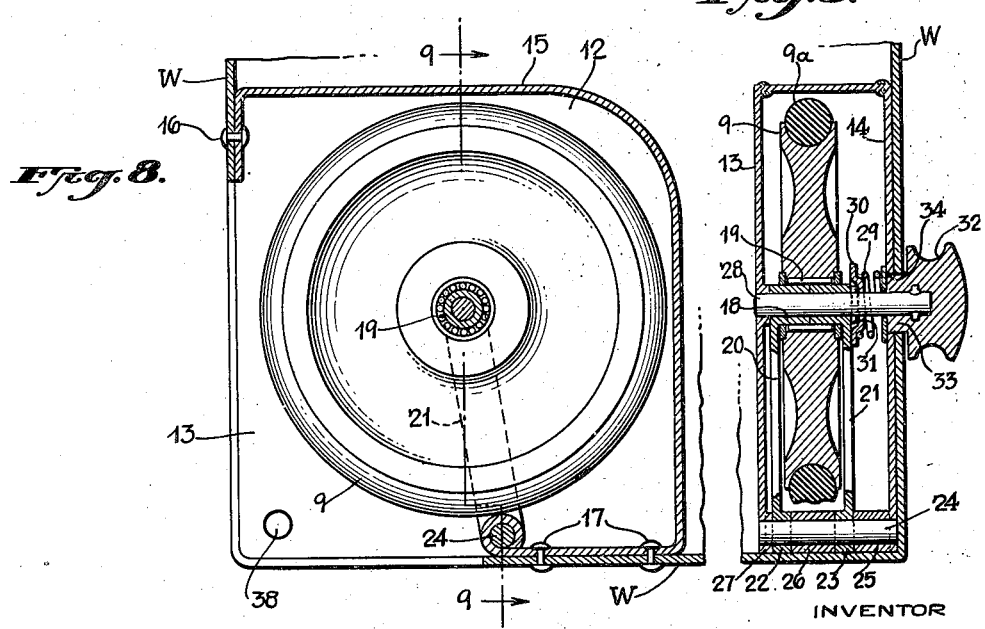
INVENTOR
BERNARD QUINTON.
BY *Ward Crosby & Neal*
his ATTORNEYS.

Patented June 7, 1949

2,472,491

UNITED STATES PATENT OFFICE 2,472,491

MOBILE LUGGAGE

Bernard Quinton, Tuckahoe, N. Y.

Application July 1, 1947, Serial No. 758,349

2 Claims. (Cl. 280—38)

This invention relates to mobile luggage. The invention is more especially useful for luggage which is relatively heavy or bulky, such that it may be carried by hand only with difficulty or for short distances without discomfort or inconvenience.

An object of the invention is to provide a mobile luggage unit of improved construction and having a pair of self-contained retractable wheels adapted to be disposed within the body contour with a minimum space loss.

A further object of the invention is to provide mobile luggage having separate wheel units of simple, durable and compact design separately mounted in spaced relation adjacent opposite lower sides thereof and retractable within the body contour.

The invention consists in the novel features, arrangements and combination of parts embodied, by way of example, in the device hereinafter described as illustrating a present preferred embodiment, and the invention will be more particularly pointed out in the appended claims.

Further objects and advantages of the invention will more fully appear from the following description taken in connection with the accompanying drawings which show, by way of example, the present preferred embodiment of the invention.

Referring to the drawings:

Fig. 1 is a perspective view of an embodiment of the invention showing the wheels in extended position for engagement with a supporting surface and with the handle shaft extended for operative engagement;

Fig. 2 is a front end elevation of the device shown in Fig. 1 with the wheels in retracted position;

Fig. 3 is a side elevation, partly in section, of said device as shown in Fig. 2;

Fig. 4 is a partial view of the device shown in Figs. 1, 2 and 3 showing the wheels retracted and the device resting on an extensible leg carried on the front end;

Fig. 5 is a plan view looking upwardly of a section of said device showing certain details of a guideway for a handle shaft;

Fig. 6 is a segmental view in perspective showing further details of said handle shaft;

Fig. 7 is a side elevation, with certain parts broken away, showing further details of the mounting of one of the retractable wheels, with the wheel in extended position;

Fig. 8 is a similar view showing said wheel in retracted position; and

Fig. 9 is a sectional view taken along the line 9—9 of Fig. 8 showing further details of the retractable wheel mounting.

Referring more particularly to Fig. 1: a container body is designated in general as 1 and in the present embodiment takes the form of a relatively large piece of hand luggage comprising a main body portion or bottom section 2 and a lid or top section 3, suitably hinged together in the usual manner and provided with suitable fastening means, such as a lock 4 and straps 5 and 6 and the usual handle 7. The front lower corner of the piece of luggage is provided with a pair of openings 8—8' disposed respectively adjacent the outer side walls of the body sections 2 and 3. A pair of retractable wheels 9—9' are disposed in these openings when in extended position, in the manner to be more particularly pointed out hereinafter. A handle shaft 10 is slidably disposed in the section 2, preferably in axial alignment with the handle 7 and an extensible leg or support 11 is mounted on the other end of the section 2 adjacent the upper edge thereof and preferably also in axial alignment with the handle 7.

Referring more particularly to Figs. 7, 8 and 9: further details relative to the mounting and operation of the wheel 9 will be described, it being understood that the opposite and corresponding wheel 9' and is corresponding mounting are constructed and arranged in an identical manner and the corresponding parts where indicated will be given the same reference numerals as the wheel 9 and its cooperating parts with the addition of the prime (') suffix. The wheel is disposed in a compartment 12 which in the present embodiment is a self-contained unit comprising an inner side wall 13, an outer side wall 14 and an end wall section designated 15 which forms the back, top and parts of the front and bottom end walls of the compartment 12. This unitary structure is suitably attached to the container body outer wall W (in this instance the outer wall of the body section 3) by suitable means, such as rivets 16, passing therethrough and through the front wall section of the compartment portion 15 and by rivets such as 17 which pass through the outer side wall W and through the forwardly extending bottom end of the compartment portion 15. It will thus be seen that this structure provides a compartment entirely separated from the interior of the container body and it will be noted with reference to Figs. 1, 2 and 9 that the width of the compartment unit has been reduced to a minimum so as to detract as little as possible from the capacity of the luggage.

The wheel 9 is supported on a hollow axle 18 and a suitable bearing such as a needle bearing 19 is interposed between the wheel hub and axle 18. The axle 18 is preferably formed from two opposite parts respectively integral with axle arms 20, 21 which provide on their lower ends journal bosses 22, 23 pivotally supported on a pin 24 which is carried in bearing portions 25, 26 and 27 preferably formed integrally with the compartment end portion 15 and side wall portion 13. A latching pin 28 is slidably mounted within the hub axle 18 and is urged inwardly by a compression spring 29 constrained between the compartment wall 14 and a washer 30 which rests against a pin 31 extending transversely through the latching pin 28. The outer end of the latching pin 28 is provided with a head 32 rigidly secured thereto and providing an outwardly extending hand engaging portion and an inwardly extending hub portion 33 which is engageable within a cooperating bore 34 (see also Fig. 7) formed in the outer compartment plate 14 and extending outwardly through the outer body wall W. In the position shown in Figs. 8 and 9 the inner end of the pin 28 extends through a hole 35 provided in the inner wall 13 of the compartment and disposed in axial alignment with the hole 34. In this position the pin is disposed in its innermost position where it is resiliently held by the spring 29; and the engagement of the inner end of the pin 28 with the hole 35 and hub 33 with the hole 34 serve jointly as latching mechanism to hold the wheel in retracted position within its compartment. The arrangement for moving the wheel to extended position and locking it there will now be described.

The outer compartment wall 14, and the adjacent portion of the body wall W are provided with an arcuate slot 36 which extends from the hole 34 in a downward direction about the axis of hinge pin 24 as a center and terminates in a hole 37 which corresponds in size to the hole 34. The slot 36 is of such width as to provide a sliding fit for the movement of the axle locking pin 28 when the pin is moved outwardly against the spring 29 by pulling on the handle head 32. A hole 38 is provided in the inner compartment wall 13 (Fig. 8) in axial alignment with the oppositely disposed hole 37 provided in the outer compartment wall 14 and adjacent body wall W. It will thus be seen that when the latching pin 28 is moved outwardly so that the latching portions are freed from locking engagement in the retracted position the wheel may be moved about its hinge axis 24 until it reaches the extended position shown in Fig. 7 at which time upon release of the handle or head 32 the pin 28 is moved inwardly so that its inner end engages the hole 38 and its hub 33 adjacent the outer end engages the hole 37 thus positively locking the wheel in its extended position for supporting the luggage.

Similarly, the wheel 9' may be individually locked in retracted or extended position by manipulation of the latching pin head 32' (Fig. 2).

Referring more particularly to Figs. 3, 5 and 6: the handle staff 10 is slidably disposed in a guideway suitably provided by the metal bracket 40, of general U-shaped cross-section, which is rigidly secured to the inside wall of the top of the container section 2 by suitable means such as rivets 41. The staff 10 is provided with a pin 42 slidable in a slot 43 extending lengthwise of the guideway 40 and provided adjacent its outer end with a transverse branch 44: so that upon withdrawing the staff 10 outwardly and slightly rotating it the pin 42 engages within the transverse slot portion 44 to prevent axial movement when the mobile luggage is pushed. The outer end of the staff 10 is provided with a plate 45 carrying one part 46 of a snap fastener for cooperative engagement with the other part 47 fixed to the outer wall of the luggage, to thereby hold the staff in retracted position when not in use.

When the wheels are in extended position and it is desired to momentarily bring the luggage to rest the luggage may be rotated about the axis of the wheels until the front end approaches a surface on which the wheels rest, and the leg 11 having been moved to its extended position will serve to support the luggage in the position shown in Fig. 4.

Having thus described my invention with particularity with reference to its preferred form, it will be obvious to those skilled in the art, after understanding my invention, that other changes and modifications may be made therein without departing from the spirit and scope of my invention, and I aim in the appended claims to cover such changes and modifications as are within the scope of the invention.

What I claim is:

1. An article of mobile luggage comprising a container body having a pair of laterally spaced compartments disposed adjacent one end and bottom corner respectively adjacent the opposite side walls of said body, said compartments having bottom and end openings through the outer contour of said body and being provided with walls separating them from the interior of said body, a pair of wheels individually rotatably journaled on respective hollow axles supported on the outer end of respectively cooperating axle arms whose inner ends are pivotally mounted adjacent an outer wall of said respective compartments, said parts being constructed and arranged so that when said axle arms are moved about their pivotal axis in one direction said wheels are disposed in retracted position within their respective compartments and when said axle arms are rotated in the opposite direction said wheels are disposed in their respective openings with a portion of their peripheries extending exteriorly of said body contour, said wheels being provided with respective latching pins slidably disposed in said hollow axles and resiliently urged inwardly, said pins having spaced apart portions engageable with respective relatively fixed portions provided by said compartment walls for selectively holding said wheel in retracted or extended position.

2. An article of mobile luggage comprising a container body having a pair of laterally spaced compartments disposed adjacent one end and bottom corner respectively adjacent the opposite side walls of said body, said compartments having inner and outer side walls and openings therebetween extending through the outer contour of said body, a pair of wheels individually rotatably journaled on respective hollow axles supported on the outer ends of respectively cooperating axle arms whose inner ends are pivotally mounted on said inner and outer walls adjacent an outer edge of said respective compartments, said parts being constructed and arranged so that when said axle arms are moved about their pivotal axis in one direction said wheels are disposed in retracted position within their respectve compartments and when said axle arms are rotated in the opposite direction said wheels are disposed in their respective openings with a portion of their peripheries extending exteriorly of said body contour, axle pins respectively slidably disposed within said hollow axles, said pins extending outwardly through arcuate slots provided in said outer side walls of said compartments and being provided on their outwardly extending ends with engageable heads disposed exteriorly of said body for moving said pins axially outwardly, said pin heads providing locking hubs on their inner ends for registered engagement in recesses provided in said outer side walls at the ends of said arcuate slots, said inner side walls of said compartments being provided with registered recesses for receiving the inner ends of said respective pins, and springs for resiliently urging said pins inwardly to thereby engage said pins into locking engagement with said registered recesses provided in the inner outer walls of said compartments.

BERNARD QUINTON.

REFERENCES CITED

The following references are of record in the file of this patent:

UNITED STATES PATENTS

| Number | Name | Date |
| --- | --- | --- |
| 1,081,670 | James | Dec. 16, 1913 |
| 1,715,865 | Rosenfeld | June 4, 1929 |
| 1,895,677 | Pinheiro | Jan. 31, 1933 |
| 2,416,752 | Hendrick | Mar. 4, 1947 |
| 2,439,660 | Keil | Apr. 13, 1948 |